United States Patent [19]

Hirai et al.

[11] Patent Number: 4,667,139

[45] Date of Patent: May 19, 1987

[54] TABLE DEVICE

[75] Inventors: Hiromu Hirai, Yatabe; Takashi Yamaguchi; Fuyuto Takase, both of Chiyoda; Tomomasa Yoshida, Mito, all of Japan

[73] Assignee: Hitachi, Ltd., Tokyo, Japan

[21] Appl. No.: 792,885

[22] Filed: Oct. 30, 1985

[30] Foreign Application Priority Data

Oct. 31, 1984 [JP] Japan ................ 59-227739

[51] Int. Cl.⁴ ............................. G05B 11/00
[52] U.S. Cl. ...................... 318/687; 318/38; 318/135; 310/13
[58] Field of Search .................. 318/687, 38, 135; 310/13, 12

[56] References Cited

U.S. PATENT DOCUMENTS 3,832,610  8/1974  Shimizu et al. ............. 318/135
3,904,900  9/1975  Shichida et al. ............ 318/135 X

*Primary Examiner*—Benjamin Dobeck
*Attorney, Agent, or Firm*—Antonelli, Terry & Wands

[57] ABSTRACT

A first table is provided on a fixed base so that the first table can be moved in one of two directions which cross each other at right angles. A second table is provided on the first table so that the second table can be moved in the other direction. Linear motors for applying the driving force to the first and second tables to directly drive these tables are provided between the fixed base and first table and between the first and second tables.

5 Claims, 7 Drawing Figures

TABLE DEVICE

FIELD OF THE INVENTION

This invention relates to a table device, and more particularly to a table device suitable for driving tables in two right-angled directions.

BACKGROUND OF THE INVENTION

A table device was proposed some years ago, which is adapted to move a table, on which a material to be processed or measured is placed, in two directions which cross each other at right angles, so as to position such a material accurately in a machining tool or a measuring apparatus. The driving means for this table device include a driving means disclosed in Japanese Patent Laid-open No. 18711/1983 dated Feb. 3, 1983 and entitled "XY table", which driving means consists of a linear motor connected to a table via a joint; and a driving means disclosed in "Theses Published in the Spring Science Lecture Meeting Held by the Learned Circle of Precision Machines in 1982" published on Mar. 22, 1982, pages 207–209, "Finely Positioning Mechanism for Static Pressure Air-Floated Stages", which consists of cross guides extending at right angles to each other and connected to a table, and a linear motor operated on the cross guides.

In the former table driving means, the driving force of a linear motor is transmitted to a table through a joint having backlash. Therefore, the transmission of the driving force is delayed due to the backlash of the joint. In the latter table driving means, the driving force of a linear motor is applied to the cross guide which is positioned away from a table. Accordingly, when a material to be processed is placed on the table or on an eccentric portion thereof, the cross guide yaws, so that it takes time to stabilize the cross guide. As may be clear from the above, these two table driving means require a long settling time in which the table is set in a predetermined position. Hence, it is very difficult to attain the speedup of a positioning operation by these table driving means.

SUMMARY OF THE INVENTION

An object of the present invention is to provide a table device which is capable of reducing the settling time for positioning a material to be processed.

To achieve this object, the present invention provides a table device having a first table provided on a fixed base so that the first table can be moved in one of two directions which cross each other at right angles, and a second table provided on the first table so that the second table can be moved in the other direction, characterized in that linear motors for directly driving these tables are provided between the fixed base and first table and between the fixed base and second table.

According to the present invention, each table can be driven directly by the relative linear motor, so that the settling time for setting each table in a predetermined position can be reduced. This enables the efficiency of an operation using this table device to be improved.

DESCRIPTION OF THE PREFERRED EMBODIMENTS

Figure 1:
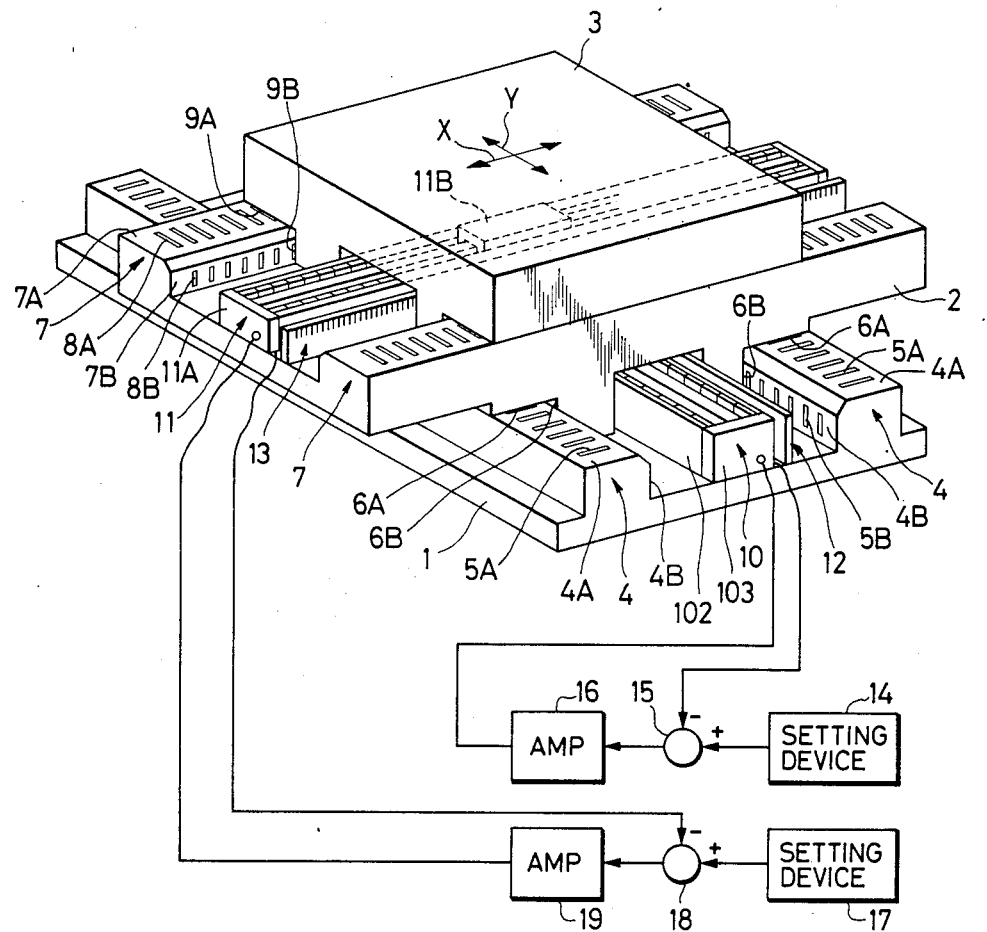
FIG. 1 is a perspective view of an embodiment of the table device according to the present invention.
Figure 5:
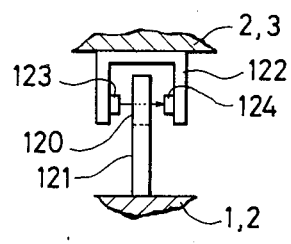
FIG. 5 is a front elevation of a position detector used for the table device of FIG. 1.

Referring to FIG. 1, reference numeral 1 denotes a fixed base, 2 a lower table provided on the fixed base 1 so that the lower table 2 can be moved in one (Y-direction) of two directions crossing each other at right angles, and 3 an upper table provided on the lower table 2 so that the upper table 3 can be moved in the other direction (X-direction). The fixed base 1 is provided with two guide portions 4 extending in Y-direction. These guide portions 4 are provided on their upper and inner side surfaces 4A, 4B with ball-and-roller bearings 5A, 5B. The lower portions of the lower table 2 which are opposed to the upper and inner side surfaces 4A, 4B, in which the ball-and-roller bearings 5A, 5B are provided, of the guide portions 4 are provided with guide surfaces 6A, 6B which are guided by these bearings 5A, 5B. The lower table 2 is provided on its upper surface with two guide portions 7 similar to the guide portions 4 on the fixed base 1 and extending in X-direction. The guide portions 7 are provided on their upper and inner side surfaces 7A, 7B with ball-and-roller bearings 8A, 8B. The lower portions of the upper table 3 which are opposed to the guide portions 7 are provided with guide surfaces 9A, 9B which are guided by these ball-and-roller bearings 8A, 8B. The linear motors 10, 11 and position detectors 12, 13 are provided between the fixed base 1 and lower table 2 and between the lower table 2 and upper table 3. The linear motors 10, 11 and position detectors 12, 13 have the same construction, respectively. The linear motor 11 is constructed so that a fixed portion 11A thereof is set firmly on the lower table 2 so as to extend in X-direction with a movable portion (movable coil portion) 11B fixed to the central portion of the lower surface of the upper table 3. The position detector 13 is provided in parallel with the fixed and movable portions 11A, 11B of the linear motor 11.

The construction of a control system for the table device will now be described. Reference numeral 14 denotes a Y-direction object position setter for the lower table 2, 15 a comparator for determining a difference between an object value from the setter 14 and a detected value from the position detector 12, 16 an amplifier adapted to amplify a difference signal from the comparator 15 and supply the signal to the movable portion 11B of the linear motor 11, 17 an X-direction object position setter for the upper table 3, 18 a comparator for determining a difference between an object value from the setter 17 and a detected value from the position detector 12, and 19 an amplifier adapted to amplify a difference signal from the comparator 18 and supply the signal to the movable portion of the linear motor 10.

Figure 2:
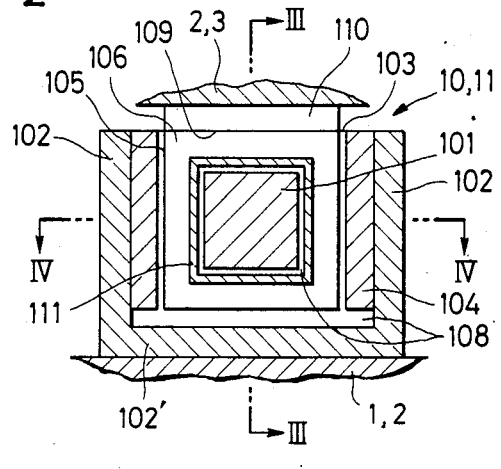
FIG. 2 is a horizontal section of a linear motor used for the table device of FIG. 1.
Figure 3:
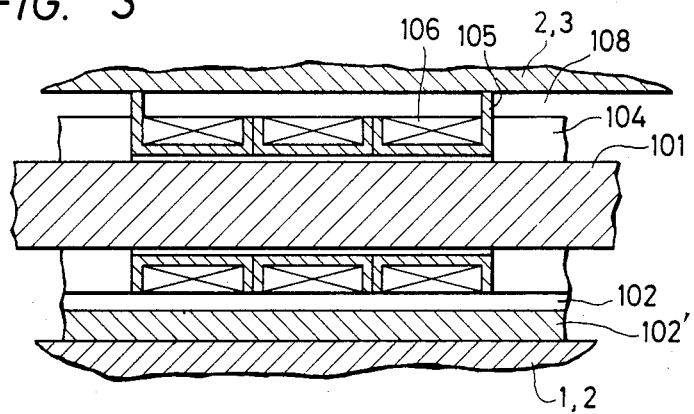
FIG. 3 is a sectional view taken along the line III—III in FIG. 2.
Figure 4:
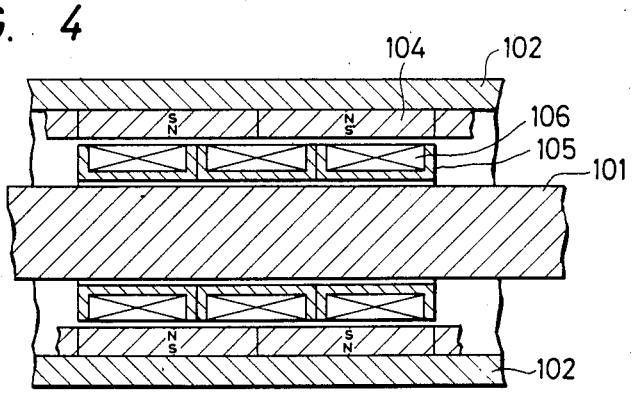
FIG. 4 is a sectional view taken along the line IV—IV in FIG. 2.

Referring to FIGS. 2–4, the reference numerals which are the same as those in FIG. 1 denote the same parts.

An outer yoke 102' is attached to the upper surface of each of the fixed base 1 and lower table 2, and outer yokes 102 on both end portions of the outer yoke 102' so that the outer yokes 102 extend in parallel with each other and at right angles to the outer yoke 102'. The outer yokes 102 are provided on their inner side surfaces with permanent magnets 104 in an opposed state.

A movable portion of each of the linear motors 10, 11 consists of a coil 106 wound around a hollow body 111 of a coil bobbin having a flange portion 105. A center yoke 101 is passed through the central portion of the coil bobbin 111 via a clearance 108. At both end portions of the outer yokes 102, side yokes 103 are provided so as to extend at right angles to the center yoke 101 and outer yokes 102, the side yokes 103 being fixed at their bottom surfaces to the upper surface of each of the fixed base 1 and lower table 2. The upper end portion 109 of the coil 106 is attached to the lower surface of each of the lower and upper tables 2, 3 via a mounting portion 110.

Each of the position detectors 12, 13 consists of a member 121 secured to each of the fixed base 1 and lower table 2 and having a slit 120, a sensor-mounting frame 122 fixed to each of the lower and upper tables 2, 3 and a light-emitting element 123 and a light-receiving element 124 provided on the frame 122. The member 121 consists, for example, of glass, and the slit 120 a plurality of evaporation films of chromium provided on the member 121 so that these films extend in the direction of advancement of the linear motor and at right angles to the upper surface of each of the fixed base 1 and lower table 2. The light from the light-emitting element 123 is sent to the light-receiving element 124 through a transparent portion of the member 121.

When voltage signals, which correspond to object values in Y- and X-directions of the tables 2, 3, are outputted from the object position setters 14, 17, they are compared in the comparators 15, 18 with voltage signals of positions from the position detectors 12, 13 to determine the differences therebetween. The signals representative of these differences are converted into electric currents and amplified by the amplifiers 16, 19 to be supplied to the coils 106 of the linear motors 10, 11. Consequently, a magnetic circuit is formed between the center yoke 101, outer yokes 102, permanent magnets 104 and coil 106, so that the force for driving the lower and upper tables 2, 3 in the Y- and X-directions is generated in the coils 106. As a result, the lower and upper tables 2, 3 are moved in the mentioned directions by object distances. During the movement of the lower and upper tables 2, 3, they are driven directly by the coils 106 of the linear motors 10, 11 provided in the central portions thereof. Accordingly, the tables 2, 3 can be set to their object positions with an accuracy of ±0.04 μm in a short period of time, and settled therein with an accuracy of 0.3 sec/15 mm step in a short period of time. This enables, for example, the cycle of an operation for processing a material placed on a table to be shortened, and the operation efficiency to be improved. According to this embodiment, the linear motors 10, 11 can be provided between the fixed base 1 and lower table 2 and between the lower and upper tables 2, 3. Therefore, the linear motor-installing spaces can be minimized, and a large space-saving effect can be obtained.

Figure 6:
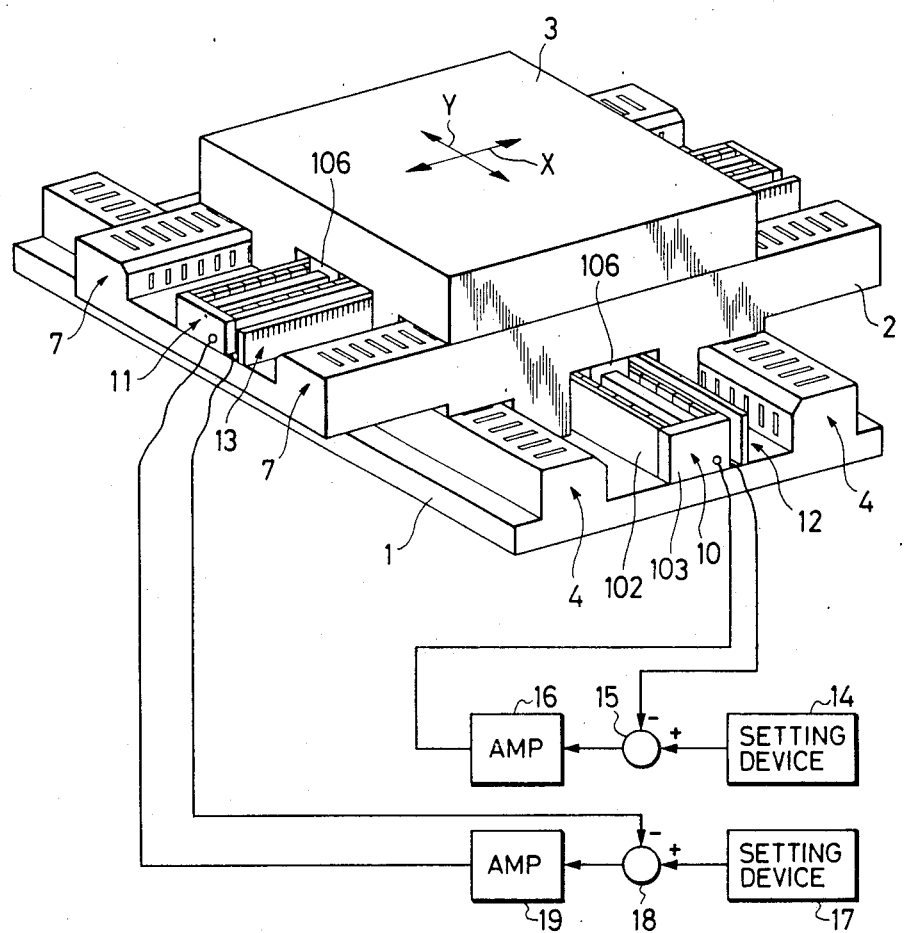
FIG. 6 is a perspective view of another embodiment of the table device according to the present invention.

Referring to FIG. 6, the reference numerals which are the same as those in FIG. 1 denote the same or equivalent parts. In the embodiment of FIG. 6, the number of coils 106 of linear motors 10, 11 is increased in Y- and X-directions so as to increase the table-driving force. If the table device is constructed in this manner, the same effect as in the previously-described embodiment can be obtained in addition to the driving force-increasing effect.

Figure 7:
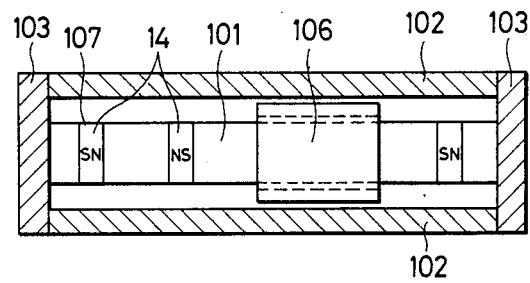
FIG. 7 is a plan view of another example of the linear motor used in the present invention.

The construction of each of the linear motors 10, 11 may be other than that described previously, i.e., it may be as shown in FIG. 7, which shows a linear motor having permanent magnets 107 provided in a spaced manner on a center yoke 101. If the linear motors are constructed in this manner, the leakage magnetic flux can be reduced, and the table-driving force can further be increased. Moreover, a ratio of the length of coil generating thrust by the magnetic force to a total length of coil increases, and the motor can be miniaturized. Also, the energy loss can be minimized, and the useless generation of heat can be suppressed.

The guide means for the tables 2, 3 are not limited to ball-and-roller bearings; plain bearings and static pressure bearings can also be used. The position detector used in this invention may also consist of a Hall device and a laser measuring instrument.

As is clear from FIGS. 4 and 7, a plurality of permanent magnets attached to the inner side surfaces of the outer yokes or center yoke are arranged so that the adjacent poles have different polarities.

According to the present invention, the force-transmitting member used in a known table device can be omitted, so that the settling time for positioning a table can be reduced. The present invention also enables the efficiency of an operation using the table device according to the present invention to be improved.

What is claimed is:

1. A table device having a first table provided on a fixed base so that said first table can be moved in one of two directions which cross each other at right angles, and a second table provided on said first table so that said second table can be moved in the other direction, characterized in that driving means for applying the driving force to said first and second tables consist of linear motors provided between the upper surface of said fixed base and said first table and between the upper surface of said first table and the lower surface of said second table, respectively, said linear motors including movable coils and permanent magnets, said movable coils of said linear motors being provided on the central portions of the lower surfaces of said first and second tables so that said linear motors extend in the directions of movements thereof, said permanent magnets in said linear motors being attached to yokes provided on the upper surfaces of said fixed base and said first table.

2. A table device according to claim 1, wherein each of said yokes consists of a center yoke, which has a movable coil wound therearound with a clearance left on the outer side of said movable coil, and which extends in the direction of movement of said linear motor, and a plurality of outer yokes provided in parallel with and on both sides of said center yoke, said permanent magnets being provided on the inner side surfaces of said outer yokes so that said permanent magnets are opposed to each other.

3. A table device according to claim 1, wherein each of said yokes consists of a center yoke, which has a movable coil wound therearound with a clearance left on the outer side of said movable coil, and which extends in the direction of movement of said linear motor, said permanent magnets being inserted in a sandwiched manner in said center yoke.

4. A table device according to claim 2, wherein said permanent magnets on the inner side surfaces of said outer yokes are arranged so that the adjacent poles of said permanent magnets have different polarities.

5. A table device according to claim 3, wherein said permanent magnets are arranged so that the adjacent poles thereof have different polarities.

* * * * *